ns
2,955,978
ESTERS OF NITROSOARYLAMINOACIDS

John J. D'Amico, Nitro, W. Va., and Ching C. Tung, Kirkwood, Mo., assignors to Monsanto Chemical Company, St. Louis, Mo., a corporation of Delaware No Drawing. Filed Dec. 4, 1957, Ser. No. 700,550

7 Claims. (Cl. 167—30)

This invention relates to esters of nitrosoarylaminoacids which compounds may be represented by the general formula

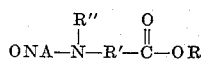

where ONA represents a nitroso substituted aryl radical, R represents an ester forming radical, as for example methyl, ethyl, propyl, isopropyl, butyl, isobutyl or amyl, R' represents an alkylene group separating the nitrogen and carbonyl by at least two carbon atoms, as for example ethylene or propylene, but preferably ethylene, and R" represents hydrogen or a nitroso group. The aryl radical may contain further substituents, as for example chloro, bromo, lower alkyl, nitro or hydroxy substituents. Preferred are para-nitrosoaryl radicals with one of the aforementioned substituents optionally substituted in the meta position. These compounds have important uses in the industrial arts and are useful intermediates. They are more stable than p-nitroso N-alkyl anilines.

Esters of nitrosoarylaminoacids may be prepared from the corresponding esters of arylaminoacids by treatment with cold nitrous acid and rearranging the intermediate N-nitroso compound in the manner described for the preparation of p-nitrosoanilines. Nitrosation and rearrangement in one step has been described (U.S. Patent 2,046,356) by treating an aromatic amine with nitrous acid under anhydrous conditions in the presence of excess hydrogen chloride which technique is also applicable to the esters of N-arylaminoacids. Alternatively, the nitrosoarylaminoacid may be esterified. Where an ester higher than methyl is nitrosated in the presence of methanolic hydrogen chloride, transesterification usually takes place so that the methyl ester is obtained. The preferred procedure for esters of nitrosoarylalanines involves simultaneous nitrosation, rearrangement, hydrolysis and esterification by treating an anilinopropionitrile with nitrous acid in alcoholic solution containing dry hydrogen chloride. Anilinonitriles are available from cheap raw materials, therefore this method provides a cheap, direct synthesis for esters of nitrosoarylalanines. These methods are not generally applicable to the preparation of esters of nitrosophenylglycines which compounds have different properties.

Example 1

A solution of hydrogen chloride in methanol of approximately 30% concentration was prepared by diluting 158 grams of a methanol solution containing 1.5 gram moles of hydrogen chloride with 25 grams of methanol. The solution was cooled to 3° C. and stirred while 36.6 grams (0.25 mole) of anilinopropionitrile was slowly added thereto at 3–10° C. The mixture was then cooled to 5° C. and 20 grams (0.28 mole) of 97% sodium nitrite added in one portion. The reaction mixture was cooled to 0° C. and stirred while the temperature was allowed to rise slowly. A precipitate soon formed and after about 23 minutes the heat of reaction brought the temperature up to 40° C. The reaction mixture was then cooled to 30° C., stirred for about 3 hours at 25–30° C., then poured into 1500 grams of ice water and stirred thoroughly for 15 minutes. To the solution resulting from stirring with ice water 80 grams of concentrated ammonium hydroxide was added slowly until the pH was 8. Stirring was continued for about an hour, then the precipitate filtered, washed with water and dried. A 92.3% yield of methyl N-(p-nitrosophenyl) beta-alaninate, M.P. 102–107° C. was obtained. After one recrystallization from alcohol the melting point was 108–109° C. Analysis gave 13.22% nitrogen compared to 13.41% calculated for $C_{10}H_{12}N_2O_3$. The same product was obtained by nitrosating a pure sample of methyl N-phenyl beta-alaninate as described in Example 2.

As further proof of structure N-(3-imino-3-methoxypropyl)aniline dihydrochloride was isolated in 99% yield from reaction of anilinopropionitrile with a cold methanolic solution of hydrogen chloride. This intermediate was hydrolyzed by aqueous ammonium hydroxide to methyl N-phenyl beta-alaninate. A mixed melting point with an authentic sample gave no depression. Reaction with sodium nitrite in an excess of methanolic hydrogen chloride yielded a product M.P. 107–108° C. containing 13.31% nitrogen. Mixed melting point with the product obtained by the foregoing procedure gave no depression.

Example 2

To 1,000 grams (8.45 moles) of 31% hydrogen chloride in methanol at 0° C. was added dropwise 253 grams (1.41 moles) of methyl N-phenyl beta-alaninate. After cooling the hydrochloride amine salt solution to 10° C., 113 grams (1.59 moles) of 97% sodium nitrite was added in one portion. External cooling was removed and the temperature of the stirred reaction mixture was allowed to rise from 10° to 25° C. over a one hour period. The stirred reaction mixture was maintained at 25–30° C. for four hours. The resulting solid was filtered, washed with 500 ml. of ethyl ether, and air dried at room temperature. The solid was dissolved in 3 liters of water. To this stirred solution, concentrated ammonium hydroxide was added dropwise until a pH of 8 was obtained. After stirring for 30 minutes, the resulting solid was filtered, washed with one liter of water and air dried at room temperature. The product, a green colored solid, M.P. 107–109° C., was obtained in 88.2% yield. Analysis gave 13.31% nitrogen as compared to 13.41% calculated for $C_{10}H_{12}N_2O_3$.

Example 3

This reaction was carried out in the same manner as described in Example 2 except 233 grams (1.41 moles) of N-phenyl beta-alanine was used. The product, M.P. 107–109° C., was obtained in 72.6% yield. Mixed melting point with the product obtained from Example 2 gave no depression. Analysis gave 13.35% nitrogen as compared to 13.41% calculated for $C_{10}H_{12}N_2O_3$.

Example 4

The reaction was carried out in the same manner as described in Example 2 except 630 grams (6.0 moles) of 34.8% hydrogen chloride in methanol, 193.3 grams (1.0 mole) of ethyl N-phenyl beta-alaninate, and 80 grams (1.12 moles) of 97% sodium nitrite were used. The product, a green colored solid, M.P. 100–105° C., was obtained in 79% yield. After recrystallization from ethyl alcohol it melted at 107–109° C. and mixed melting point with the product obtained from Examples 1, 2 and 3 gave no depression. Analysis gave 13.26% nitrogen as compared to 13.41% calculated for $C_{10}H_{12}N_2O_3$.

Example 5

A solution containing 24.3 grams of concentrated hydrochloric acid in a liter of water was cooled to 5° C. and to it added 42 grams of methyl N-(p-nitrosophenyl) beta-alaninate. The mixture was stirred until a clear solution resulted and then cooled to 0° C. A solution of 14.4 grams of 97% sodium nitrite in 60 ml. of water was added slowly while keeping the reaction mixture at about 0° C. The greenish-yellow solid was filtered, washed with water until neutral and dried. An 89.5% yield of methyl N-nitroso N-(p-nitrosophenyl) beta-alaninate was obtained. The melting point after one crystallization from methanol was 60–61° C. Analysis gave 17.6% nitrogen as compared to 17.7% calculated for $C_{10}H_{11}N_3O_4$.

Example 6

A 36.5% solution of hydrogen chloride in methanol, 375 grams (3.75 mole), was cooled to 0° C. and 100 grams (0.625 mole) of 3-(m-toluidino)propionitrile was added over a ten minute period. After stirring for fifteen minutes, 50 grams (0.704 mole) of 97% sodium nitrite was added in one portion to the stirred reaction mixture at 5° C. The temperature was allowed to rise slowly. A precipitate soon formed and after 5 minutes the heat of reaction brought the temperature up to 40° C. The stirred reaction mixture was cooled to 30° C. and stirring continued for 4 hours at 25–30° C. The precipitate was filtered off, washed with 300 ml. of anhydrous ethyl ether and after drying added to 1500 grams of ice water and the mixture stirred for 30 minutes. To the resulting solution at 10° C. concentrated ammonium hydroxide was added dropwise until the pH was 8. Then 300 ml. of heptane was added to the reaction mixture and stirring continued for 2 hours. The precipitate was filtered, washed with 500 ml. of water and then with 500 ml. of heptane and air dried at room temperature. The methyl N-(3-methyl-4-nitrosophenyl)-beta-alaninate, after recrystallization from methyl alcohol, melted at 62–63° C. Analysis gave 12.8% nitrogen as compared to 12.6% calculated for $C_{11}H_{14}N_2O_3$.

Example 7

To a reactor was charged 82 grams (0.418 mole) of 3-(alpha-naphthylamino)propionitrile. There was then added 505 grams (4.18 moles) of 30.4% solution of hydrogen chloride in methanol. The mixture was cooled to 0° C. and 34 grams (0.47 mole) of 95% sodium nitrite added in one portion. The temperature of the stirred reaction mixture was allowed to rise slowly to 40° C. over a one hour period. While continuing the stirring the mixture was cooled to 25° C. and maintained at 25–30° C. for 5 hours. The reaction mixture was then poured into 2000 grams of crushed ice, stirred for 1 hour and concentrated ammonium hydroxide added until the pH was 8. To the stirred mixture 400 ml. of heptane was added and stirring continued for 1.5 hours. The precipitate was filtered off, washed with 400 ml. of water and then with 400 ml. of heptane and air dried at room temperature. The methyl N-(4-nitroso-1-naphthyl)-beta-alaninate melted at 150–155° C. with decomposiiton after recrystallization from methanol. Analysis gave 10.7% nitrogen and 64.4% carbon as compared to 10.9% nitrogen and 65.1% carbon calculated for $C_{14}H_{14}N_2O_3$.

The esters of nitrosophenylaminoacids are valuable for catalyzing the modification of Butyl rubber by heat. One of the deficiencies of Butyl rubber is poor hysteresis properties by which is meant slow recovery after distortion. The vulcanizates are logy and lack snap after elongation and release. However, heating Butyl rubber with an ester of a nitrosoarylaminoacid improves the hysteresis properties. To demonstrate this effect the test material was added to 400 grams of Butyl rubber on a rubber mill and after mixing 5 minutes the mixture added with 800 grams of Butyl rubber to a Banbury mixer at 300° F. Heating and mixing at 300° F. was continued for 10 minutes, then 180 grams of furnace carbon black and 420 grams of channel black added. Mixing and heating was continued for another 10 minutes and vulcanizable stocks prepared by adding 7.5 parts by weight of zinc oxide, 1.5 parts by weight of 2,2'-dithiobis benzothiazole, 1.5 parts by weight of tetramethylthiuram disulfide and 3 parts by weight of sulfur to each 225 grams of base prepared as described. After vulcanizing by heating in a press for 45 minutes at 144° C. torsional hysteresis was determined at room temperature with an apparatus which consists essentially of a torsion pendulum. The sample of rubber supplied the force to restore the pendulum when it was deflected. In the table below the logarithm decrement of the observed amplitude is recorded.

| Test material: | Torsional hysteresis, av. |
|---|---|
| None | .42 |
| Methyl N-(p-nitrosophenyl) beta-alaninate | .20 |
| Methyl N-nitroso N-(p-nitrosophenyl) beta-alaninate | .20 |
| 3-(p-Nitrosoanilino)propionamide | .45 |
| N-(p-Nitrosophenyl) beta-alanine | .39 |

These data show the efficacy of the new compounds and show that similar properties are not shared by the acids and amides. Negative results were observed with the ethyl ester of p-nitrosophenylglycine.

The new compounds are also valuable fungicides, especially against soil borne pathogens. Activity was demonstrated by pipetting a 5 ml. aliquot of a 1% solution of the test material into a Mason jar containing one pound of infected soil. This amounts to 100 p.p.m. of the test material. The jar was sealed and the contents thoroughly mixed by vigorous shaking. The treated soil was incubated at room temperature and 24 hours later transferred to 4 inch clay pots. Five seeds of each of four crop plants, beans, cotton, cucumber and peas, were sown in each pot. The seeded pots were then incubated at 70° F. and at high humidity (98% R.H.) to insure activity of the "damping-off" organisms in the soil. Twenty-four hours later, the pots were removed to a greenhouse where disease assessments were made 10–14 days later. The percent emergence and disease incidence was recorded. The measure of effectiveness was the number of healthy plants emerging out of 20. Eleven or less healthy plants are observed with an untreated control and therefore a test material giving a sum of 11 or less is regarded as inactive whereas more than 17 is rated excellent, 15–17 promising and 12–14 fair. The figures in the table are averages of two replications.

| Test material: | Healthy plants out of 20 |
|---|---|
| Methyl N-(p-nitrosophenyl) beta-alaninate | 17.5 |
| Methyl N-(4-nitroso-m-tolyl) beta-alaninate | 16.0 |
| Methyl N-(4-nitroso-1-naphthyl) beta-alaninate | 12.5 |
| Untreated control | 2.0 |

In this test 3-(p-nitrosoanilino)propionamide was rated inactive, again showing that similar properties are not shared by related compounds.

It is intended to cover all changes and modifications of the examples of the invention herein chosen for purposes of disclosure which do not constitute departures from the spirit and scope of the invention.

This application is a continuation-in-part of copending application Serial No. 543,584, filed October 28, 1955 now U.S. Patent No. 2,852,553.

What is claimed is:

1. A lower alkyl ester of N-nitroso N-(p-nitrosophenyl) beta-alanine.

2. Methyl N-nitroso N-(p-nitrosophenyl) beta-alaninate.

3. The method of destroying fungi in soil which comprises applying to the soil in quantity sufficient to destroy fungal organisms causing disease a compound of the structure

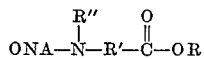

where ONA represents a nitroso substituted aryl radical selected from the group consisting of phenyl, naphthyl and meta-substituted phenyl wherein the substituent is selected from the group consisting of chloro, bromo, lower alkyl, nitro and hydroxy, R represents lower alkyl, R' represents an alkylene group separating the nitrogen and carbonyl by two carbon atoms and R'' is selected from a group consisting of hydrogen and nitroso.

4. The method of destroying fungi in soil which comprises applying to the soil in quantity sufficient to destroy fungal organisms causing disease a compound of the structure

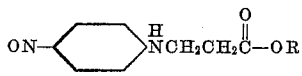

where R represents a lower alkyl group.

5. The method of destroying fungi in soil which comprises applying to the soil in quantity sufficient to destroy fungal organisms causing disease methyl N-(p-nitrosophenyl) beta-alaninate.

6. The method of destroying fungi in soil which comprises applying to the soil in quantity sufficient to destroy fungal organisms causing disease methyl N-(4-nitroso-m-tolyl) beta-alaninate.

7. The method of destroying fungi in soil which comprises applying to the soil in quantity sufficient to destroy fungal organisms causing disease allyl N-(p-nitrosophenyl) beta-alaninate.

References Cited in the file of this patent

UNITED STATES PATENTS 2,852,553   D'Amico _____ Sept. 16, 1958

FOREIGN PATENTS 541,328   Great Britain _____ Nov. 24, 1941